(12) United States Patent
Jepson et al.

(10) Patent No.: US 11,062,335 B2
(45) Date of Patent: Jul. 13, 2021

(54) ONLINE SURVEY SPAWNING, ADMINISTRATION AND MANAGEMENT

(71) Applicant: InsightExpress, Inc., Stamford, CT (US)

(72) Inventors: Stephen Jepson, Patterson, CA (US); Jody Francis Powlette, Bellbrook, OH (US); Michael Queenan, Ridgefield, CT (US)

(73) Assignee: KANTAR LLC, New York, NY (US)

( * ) Notice: Subject to any disclaimer, the term of this patent is extended or adjusted under 35 U.S.C. 154(b) by 1358 days.

(21) Appl. No.: 14/629,261

(22) Filed: Feb. 23, 2015

(65) Prior Publication Data

US 2015/0170173 A1 Jun. 18, 2015

Related U.S. Application Data

(63) Continuation of application No. 13/549,597, filed on Jul. 16, 2012, now abandoned, which is a
(Continued)

(51) Int. Cl.
*G06Q 30/02* (2012.01)

(52) U.S. Cl.
CPC ......... *G06Q 30/0203* (2013.01); *G06Q 30/02* (2013.01); *G06Q 30/0201* (2013.01); *G06Q 30/0242* (2013.01); *G06Q 30/0243* (2013.01); *G06Q 30/0244* (2013.01); *G06Q 30/0245* (2013.01)

(58) Field of Classification Search
None
See application file for complete search history.

(56) References Cited

U.S. PATENT DOCUMENTS 5,948,061 A 9/1999 Merriman et al.
6,070,145 A 5/2000 Pinsley et al.
(Continued)

FOREIGN PATENT DOCUMENTS

WO WO-2008075052 A1 * 6/2008 ............. G06Q 30/02

OTHER PUBLICATIONS

Abitbol, Alan; Sternadori, Miglena M. Consumer location and ad type preferences as predictors of attitude toward femvertising. Journal of Social Marketing; Bingley vol. 10, Iss. 2, (2020): 179-195. DOI: 10.1108/JSOCM-06-2019-0085. (Year: 2020).*
(Continued)

*Primary Examiner* — Patricia H Munson
*Assistant Examiner* — Nancy N Prasad
(74) *Attorney, Agent, or Firm* — Hickman Becker Bingham Ledesma LLP

(57) ABSTRACT

A method and apparatus for spawning and management of online surveys is provided. An administration and redirector subsystem (ARS) is used manage ongoing surveys for a plurality of sites. Surveys can be added to or removed from individual sites using the ARS. The ARS also tracks statistics for individual surveys. Redirector tags invite users to participate in surveys and track user survey participation through cookies. The system can be used to conduct advertisement effectiveness studies. Tracker tags and corresponding cookies are used to track users who have viewed content containing the tag. Each study is issued a unique content tag, but uses the same redirector tag.

20 Claims, 3 Drawing Sheets

Related U.S. Application Data continuation of application No. 11/811,963, filed on Jun. 12, 2007, now Pat. No. 8,234,152.

(56) References Cited

U.S. PATENT DOCUMENTS

| | | |
|---|---|---|
| 6,779,042 B1 | 8/2004 | Kloba et al. |
| 7,010,497 B1 | 3/2006 | Nyhan et al. |
| 7,730,509 B2 | 6/2010 | Boulet et al. |
| 7,752,190 B2 | 7/2010 | Skinner |
| 8,146,126 B2 | 3/2012 | Downey et al. |
| 2002/0002482 A1 | 1/2002 | Thomas |
| 2002/0082923 A1 | 6/2002 | Merriman et al. |
| 2003/0150908 A1 | 8/2003 | Pokomy et al. |
| 2003/0187976 A1 | 10/2003 | Decime |
| 2004/0088212 A1 | 5/2004 | Hill |
| 2004/0153508 A1 | 8/2004 | Alcorn et al. |
| 2004/0210471 A1 | 10/2004 | Luby et al. |
| 2005/0132267 A1 | 6/2005 | Aviv |
| 2006/0041480 A1 | 2/2006 | Briggs |
| 2006/0129457 A1* | 6/2006 | Nyhan ............... G06Q 30/0269 705/14.41 |
| 2007/0156532 A1 | 7/2007 | Nyhan et al. |
| 2007/0162379 A1* | 7/2007 | Skinner ............... G06Q 40/04 705/37 |
| 2007/0208610 A1 | 9/2007 | Pisaris-Henderson et al. |
| 2007/0214045 A1 | 9/2007 | Subramanian et al. |
| 2008/0243812 A1* | 10/2008 | Chien ............... G06F 16/951 |
| 2008/0294523 A1 | 11/2008 | Little |
| 2009/0172091 A1 | 7/2009 | Hamel |
| 2010/0030597 A1* | 2/2010 | Lewis, Jr. ............. G06Q 30/02 705/14.61 |
| 2011/0213655 A1 | 9/2011 | Henkin et al. |
| 2011/0238495 A1* | 9/2011 | Kang ............... G06Q 30/02 705/14.49 |

OTHER PUBLICATIONS

Little, U.S. Appl. No. 60/891,995, filed Feb. 28, 2007, provisional of Little, U.S. Appl. No. 12/039,449 (U.S. Publication No. 2008/0294523).

* cited by examiner

ONLINE SURVEY SPAWNING, ADMINISTRATION AND MANAGEMENT

PRIORITY CLAIM

This application claims the benefit as a Continuation of application Ser. No. 13/549,597, filed Jul. 16, 2012, titled "Online Survey Spawning, Administration and Management", which is a Continuation of application Ser. No. 11/811,963, filed Jun. 12, 2007, titled "Online Survey Spawning, Administration and Management" (now U.S. Pat. No. 8,234,152 issued Jul. 31, 2012), the entire contents of each of which is hereby incorporated by reference as if fully set forth herein, under 35 U.S.C. § 120. The applicant hereby rescinds any disclaimer of claim scope in the parent application(s) or the prosecution history thereof and advises the USPTO that the claims in this application may be broader than any claim in the parent application(s).

FIELD OF THE INVENTION

The present invention relates to web survey recruitment systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A number of internet publishing business models exist. One publishing business model includes three players: advertisers, market researchers and publishers. Publishers create web sites that provide content which generates user traffic. User traffic attracts advertisers and allows publishers to sell advertisement space. Advertisements are typically stored on a central ad server. The ad server can either be part of a large advertisement network, or managed by the publisher. User traffic also attracts market researchers, who also may use advertisement space for conducting surveys.

For the purpose of explanation, reference shall be made to a hypothetical web publisher WePublish. In order to maximize revenue, the web site of WePublish can run a number advertisement campaigns and research initiatives concurrently. One such advertisement campaign AC1 could be created by a hypothetical advertiser WeAdvertise, hired by a car manufacturer. The WeAdvertise ad campaign for the car manufacturer may include three advertisements: AD1, AD2 and AD3. To measure the effectiveness of the advertisement campaign, the car manufacturer may hire a hypothetical market research firm WeResearch to conduct a survey SV1 to measure the effectiveness of the ad campaign.

Advertisement effectiveness can be measured by administering a survey to two groups of people: a test group and a control group. The test group has seen one or more advertisements from the ad campaign under study, while the control group has not. The difference between how the two groups answer the survey indicates the advertisement campaign's effectiveness. An ad campaign whose effectiveness is being measured by a survey is referred to herein as "measured campaign".

To test the effectiveness of survey SV1, WeResearch must accurately assign the takers of the survey SV1 to either the control group or the test group. One technique that market research companies may use to determine whether to assign a survey taker to the test group or the control group is to use a "tracking tag" to place "tracking cookies" on the machines of users that have been exposed to the advertisements of a measured campaign.

A tag is a snippet of executable code. When a tag is included in a page that is sent to a browser, the executable code of the tag typically executes when the browser decodes the page. In the case of a tracking tag, execution of the code places a tracking cookie on the machine on which the browser that decoded the page that contains the tag is executing.

For example, WeResearch may issue to WeAdvertise a tracking tag TT1 for the ad campaign AC1. Typically, one tracking tag is used per measured campaign, but sometimes multiple tracking tags are used. If an advertiser has ads for multiple measured campaigns, each measured campaign would typically have a unique tracking tag.

Advertisers insert the tracking tag for each particular measured campaign into the ads that belong to the measured campaign. In the present example, WeAdvertise would place the tracking tag TT1 into advertisements AD1, AD2 and AD3. The advertisements, including the embedded tracking tags, are then served to publishers by the ad server. The publishers include the ads in web pages sent to users by the publishers.

In the present example, WePublish would include AD1, AD2 and AD3 in web pages sent by WePublish to users. Whenever a user sees a web page that contains an advertisement that has a tracking tag for a particular ad campaign, the tracking tag places on the user's machine a cookie indicating that a user was exposed to an advertisement that belongs to that particular ad campaign. Thus, when a user views a web page from WePublish that includes any of ads AD1, AD2 and AD3, the tracking tag TT1 embedded in the ad causes a tracking cookie TC1 to be placed on the user's machine. The tracking cookie TC1 indicates that the user has been presented with an advertisement from ad campaign AC1.

To invite survey takers to take survey SV1, WeResearch creates a "survey-invitation tag" SIT1 for the survey SV1 for the ad campaign AC1. WeResearch then embeds the survey-invitation tag SIT1 in a banner B1 that does not contain any information relating to ad campaign AC1. Banner B1 may then be added into the advertisement rotation. Such empty advertisements are known as house advertisements or PSA. If a user is exposed to a house advertisement, the survey-invitation tag in the banner (1) presents to the user an invitation to take the survey associated with the survey-invitation tag, and (2) reads the user's cookie information to determine whether the user has been exposed to ads from the corresponding campaign. For example, when user are exposed to banner B1, SIT1 present the user with an invitation to take survey SV1, and read the user's cookie information to determine whether the user has been exposed to advertisements from ad campaign AC1.

At any given time, the ads that are included in the web pages that are being served by a publisher may belong to many concurrently running measured campaigns. For example, in addition to advertisements AD1, AD2 and AD3, WePublish web pages may include advertisements from many other measured campaigns AC2-AC50. Unfortunately, the existence of large numbers of concurrently-running campaigns, each of which have their own corresponding survey-invitation tag and survey, presents a number of challenges to the publisher.

For example, separate research initiatives are typically unaware of each other. Therefore, the survey invitation for each measured campaign is presented to users without regard to whether the users have received survey invitations for other measured campaigns. Consequently, some users may be served a disproportionately large number of survey invitations, while others none at all. Further, a single web page may have multiple survey invitation tags. This would make the site appear as having a large number of popups and reduce perception of site quality.

The integration and management of survey-invitation tags also presents a large burden on the web site publisher. Because every advertisement campaign and research initiative requires distinct house advertisement and survey-invitation tags, the management burden increases with the number of studies and advertisement campaigns. Moreover, because every study requires a house advertisement to embed the survey-invitation tag and recruit survey takers, there is a loss of a revenue stream to the publisher.

There is clearly a need for a system that allows efficient management of advertisement campaigns, research initiatives and their corresponding tags to reduce the programming and maintenance burden on the publisher, to allow for controlled spawning of surveys and to eliminate house advertisements to increase revenue for the publisher.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

OVERVIEW

Techniques are provided for replacing survey-invitation tags, which previously had to be created and managed on a per-campaign basis, with a single "redirector" tag. The redirector tag recruits survey participants, facilitates proper grouping for each participant, and tracks which surveys have been completed. A single redirector tag handles these functions for multiple surveys on a site.

The redirector tag is not tied to any particular survey, research initiative, or campaign. Instead, the redirector tag has code which, when executed, selects an appropriate survey among a pool of currently-active surveys. The redirector tag then causes the survey, or an invitation to the survey, to be presented to the user whose machine decoded the page that contained the redirector tag. The redirector tag may be distributed to publishers in the same manner as survey-invitation tags, such as continuously ad served, or ad hoc ad served. However, unlike survey-invitation tags, the redirector tag may also be disseminated by hardcoded placement within the web pages of a publisher. Further, unlike the survey-invitation tags, the redirector tag may be placed in web pages without regard to which advertisements those web pages contain.

In addition to selecting and presenting a survey invitation, the code of the redirector tag may perform other functions to improve user experience. For example, the code of the redirector tag may gather information upon which survey selection may be based. Thus, the redirector tag may signal to the AR to read the cookie information placed by previously-executed tracking cookies, as well as indicate information about the web page in which the redirector tag was embedded. In addition, the redirector tag may store cookie information that is used by later-executed redirector tags. The cookie information stored by the redirector tag may be, for example, a timestamp indicating the most recent time that the user was presented with any survey invitation. A later-executed redirector tag may cause the AR to read the timestamp, and determine that it is too soon to present the user with another survey invitation. In another embodiment of the present invention, the functionality of the redirector tag can be incorporated into the tracker tag. Therefore tracking of advertisements as well as spawning and tracking of surveys is handled by a single tag.

The Recruitment Process

Figure 1:
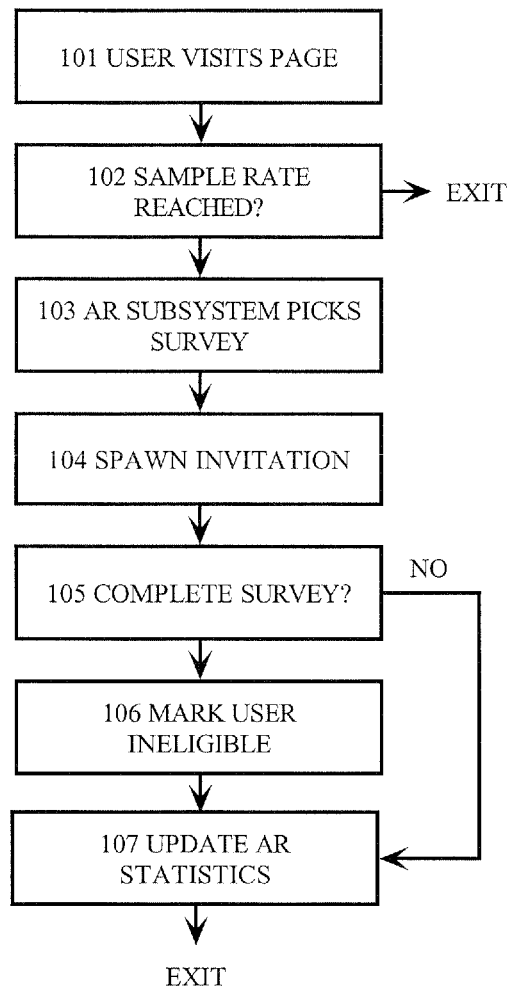
FIG. 1 is a flow diagram of survey recruitment, according to an embodiment of the present invention.

FIG. 1 illustrates steps in a survey participant recruitment process. The components involved in the recruiting process are collectively referred to herein as the administration and recruiting (AR) subsystem. The recruitment process begins when a user visits a web page that contains a redirector tag 101. The redirector tag causes the AR subsystem to determine whether any survey invitation should be presented to the user. This decision may be based on information provided by survey administrators and publishers.

Specifically, survey administrators and publishers may have previously provided the AR subsystem with data that specifies the conditions upon which invitations are spawned. For example, in an embodiment, invitations are spawned at a predetermined sample rate 102. The rate could be based on loading of a particular page, or a page loading for a predetermined number of times, or a count of unique users visiting a page. If spawning conditions are met, then survey recruitment process progresses to select an appropriate survey (step 103), otherwise the recruitment process exits.

A survey is picked based on a variety of factors, including the information that the redirector tag provides to the AR subsystem. Such information may include, for example, a "referring URL" of the page whose display cause the redirector tag to execute. The referring URL may indicate, for example, that the user was viewing a sports-oriented web page. Based on this information, the AR subsystem may decide to select a survey that is related to sports. On the other hand, the AR subsystem may decide not to send any survey invitation at all, based on the referring URL.

Additional factors may include the priority, participant eligibility, and whether a quota has been met. The survey selection may also be based on which tracking cookie information retrieved from the user by the redirector tag. Such tracking cooking information may indicate, for example, that the user has been exposed to certain ad campaigns. If it is particularly important to find members of the test group for a particular campaign, then the tracking information may be used to pick a survey for which the user would be in the test group. On the other hand, if it is particularly important to find members of a control group for a particular ad campaign, then users that were not exposed to the advertisement can be selected. The survey selection process by the AR subsystem is outlined in greater detail in FIG. 2.

Once a survey is selected and a user is placed in the appropriate group, the redirector tag generates an invitation for the user to take the selected survey 104. The invitation may be presented in a variety of forms. For example, the invitation may be a banner, a pop-up, etc. According to one embodiment, the redirector tag is placed in the "footer" portion of a web-page, to allow for a "polite" download. That is, content of the Web site is loaded first, and the redirector tag is only executed after the user is seeing the content of the requested web page.

If user completes the selected survey 105, then the AR subsystem creates or modifies a redirector cookie on the client to note survey participation 106. The AR subsystem updates its count of participants for that particular survey and group 107. The survey is shut off once the quota for number of respondents for each group has been met.

The AR subsystem manages ongoing surveys for multiple sites/publishers. In an embodiment, each site has a unique redirector tag. The AR subsystem has a secure web interface. The AR subsystem keeps various statistics for each survey group, such as study, control and view through. View through is to exposure to brand advertising but not the specific campaign which is being tested. For each group, a count of the number of impressions as well as completions is kept. The priority of each survey can be set, as well as start and expiration time.

Significantly, a survey administrator can add or remove a survey to the active survey pool without sending to publishers any tags for the new survey. Rather, if a survey is to be fielded at a site that already has an embedded redirector tag, the tag remains unaltered and an additional redirector tag does not need to be issued. The AR subsystem adds the survey to a list of ongoing surveys for a site, and the existing redirector tag redirects users to the newly added survey. Conversely, if a publisher or administrator disables a survey, the survey is removed from the active list of surveys on a site automatically, without having to communicate to the sites that the survey is no longer active.

Survey Selection

Figure 2:
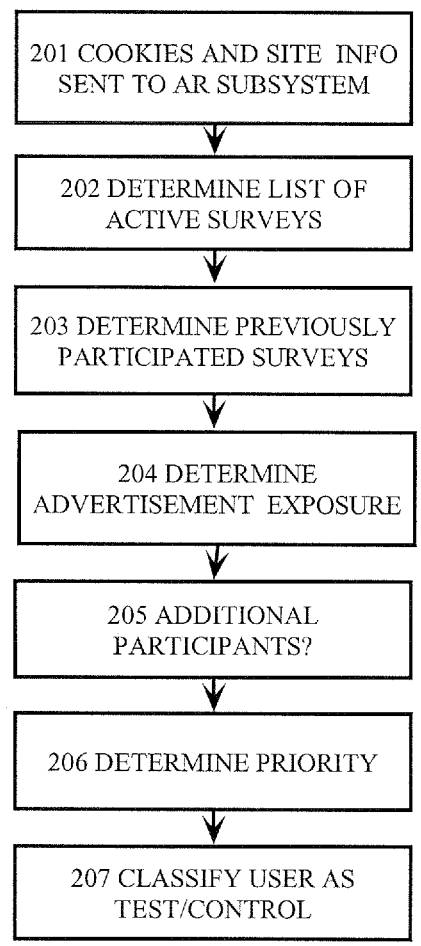
FIG. 2 is a flow diagram of survey selection, according to an embodiment of the present invention.

Referring to FIG. 2, the redirector tag communicates information to the AR subsystem 201. As mentioned above, the information may include the referring URL, tracker cookies, and redirector cookies. Based on the site communicated by the redirector tag, the AR subsystem determines a list of ongoing surveys 202. Participant eligibility is determined from tracker and redirector cookies.

Content of redirector cookies is examined to determine which surveys a user has participated in, if any 203. If a user has already participated in any of the ongoing surveys, those surveys are removed from the list of candidate surveys for the user. The AR subsystem also determines what advertisements the user has been exposed to from tracker cookies 204. The AR subsystem then consults its internal records to see whether each group (test/control) in the survey list requires additional participants 204. The AR subsystem combines the exposure and participation information to determine final eligibility. The survey is picked from the list based on study priority 206. The AR subsystem proceeds to place the user in the appropriate group 207 which can be test or control or any other group used in the study.

Example

For the purpose of explanation, consider a scenario in which WeAdvertise has agreements to run various advertisement campaigns on WePublish. One of the advertising campaigns may be advertising campaign AC1, which includes a series of ads for a car company to promote a new coupe. WeAdvertise creates a set of advertisements depicting the coupe and begins rotation of the ads on WePublish.

Assume that WeResearch has been engaged by the car manufacturer to determine the effectiveness of the campaign AC1. The car manufacturer may specify the target completion date for the effectiveness survey SV1 and the number of respondents needed for each group (control and test) of potential survey takers.

WeResearch registers the awareness survey SV1 with the AR subsystem. The registration information may specify the survey trigger condition, which could be based on multiple factors, such as target completion date, an acceptable rate of invitations, and specific pages from which invitations can be spawned. Once the survey is enabled, it is added to the list of available surveys for a redirector tag.

If WeResearch has already provided a redirector tag to WePublish for other surveys, WeResearch need not provide WePublish with any new tags. The new survey SV1 automatically becomes a candidate survey to show to visitors to the WePublish site. If WePublish does not already have a redirector tag from WeResearch, WeResearch would issue a single redirector tag to WePublish. WePublish may statically embed the redirector tag into the footers of the web pages that WePublish sends to users. WeResearch also issues tracking tags to WeAdvertise. WeAdvertise embeds the tracker tags in each ad of the car manufacturer advertisement campaign AC1.

Another survey SV2 may be added to the WeResearch pool for a sporting goods company who wants to learn from sports fans about their designs. Specifically, the sporting goods company contacts WeResearch to conduct the survey. WeResearch adds the sports opinion survey SV2 to the list of active surveys that are associated with a redirector tag previously provided to WePublish. The active survey list for WePublish will now include two surveys: SV1 and SV2.

The sporting goods manufacturer may require a very fast turnaround time for their survey, and request that WeResearch prioritize the study. Because a single tag controls spawning of all surveys, the trigger conditions for surveys are adjusted to provide an acceptable rate of survey takers for SV2.

When a visitor retrieves a web page from WePublish, two events occur. First, the redirector tag determines whether conditions to trigger an invitation to take a survey have been met. Second, if there are advertisements for the coupe present on the page, the tracker tag embedded in the advertisement places or modifies a tracker cookie on the user's machine to indicate that the user was exposed to the advertisement.

Assuming that the survey invitation trigger conditions are met, the redirector tag also sends to the AR subsystem any tracker or redirector cookie information, and the URL of the page. From the tag identity information, the site redirector determines a list of ongoing surveys on the site: car and sports manufacturer.

Because the sporting goods manufacturer obtained higher priority, the sporting goods survey invitation is selected for presentation. The web surfer may refuse to participate in that particular survey. If the surfer refuses, the redirector tag will place or modify the redirector cookie on the user's machine to indicate the user did not want to participate in the survey. In the event that the user participates in the survey, the redirector tag modifies the redirector cookie to specify that the user took the survey. In either case, the redirector tag will not issue survey invitations for that particular survey to that user again.

The same web surfer may continue browsing the sports web site and eventually successfully trigger another survey invitation. As described earlier, the redirector tag sends web site identity information and as well as a redirector cookie and tracker cookies from all of the ongoing advertisement and research campaigns to the redirector and administration subsystem. The redirector produces a list of ongoing surveys for that particular redirector tag: car coupe and sporting good manufacturer.

The redirector examines redirector cookie information and determines that the user has refused to take the sporting goods survey. The redirector removes the sporting goods survey from the available list of surveys. In our example the only survey that is left is by the car company. The tracker cookies are examined by the redirector, and it is determined that the web surfer was already exposed to the car advertisements.

The web surfer is placed in the test group. A web page is generated with a survey invitation. The invitation is tied to the car company survey. Upon completion of the survey, the redirector tag modifies the control redirector that the user has completed the survey. In this example, because the user has completed every survey that was administered on the site, even if triggering a survey invitation, the redirector will no longer generate web pages with survey invitations because the user has completed all the surveys.

Hardware Overview

Figure 3:
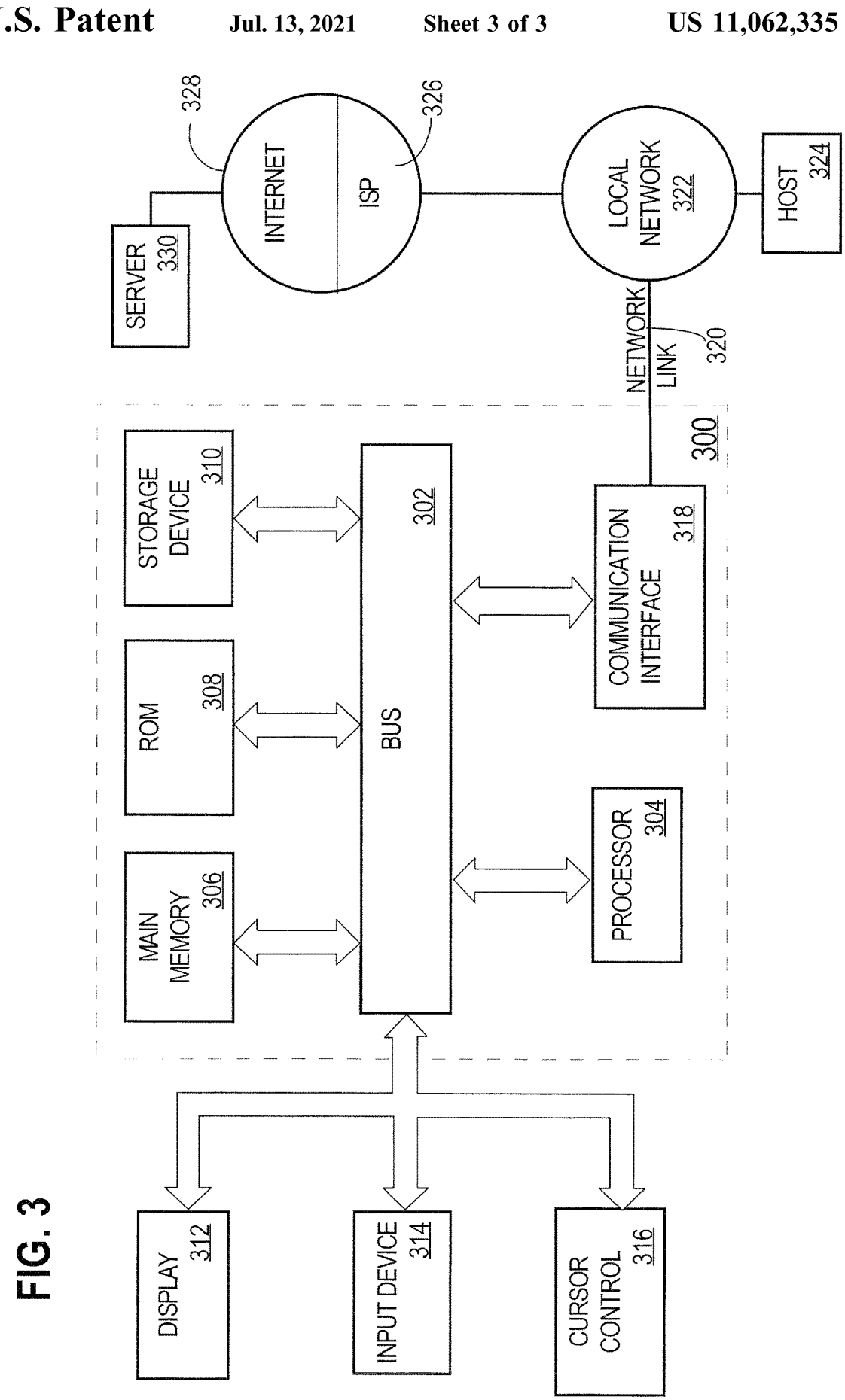
FIG. 3 is an example computer system computer system, according to an embodiment of the present invention.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of administering surveys, the method comprising:
    a redirector receiving cookie information from a client;
    wherein the client sent the cookie information in response to a particular web page being decoded at said client;
    wherein the cookie information includes first data for selecting a survey, wherein the first data includes one or more items from the following set of items:
        an identifier of a particular ad campaign, of a plurality of ad campaigns, that is associated with one or more content items that were sent to the client before the particular web page was decoded at the client,
        a URL of the particular web page, and
        information identifying one or more particular advertisements that have been loaded at the client;
    the redirector maintaining second data for selecting a survey, wherein the second data includes one or more items from the following set of items:
        information identifying one or more surveys in which a user of the client has participated,
        survey start times, and
        survey expiration times;
    the redirector selecting a particular survey of a plurality of surveys based, at least in part, on a particular set of data that comprises:
        one or more items from the first data, and
        one or more items from the second data; and
    causing an invitation to the particular survey to be displayed on the client;
    wherein the method is performed by one or more computing devices.

2. The method of claim 1, further comprising:
    determining that one or more conditions upon which a survey invitation is spawned are met;
    wherein determining that the one or more conditions are met is based, at least in part, on one or more of:
        a sample rate for survey invitations,
        a number of times the particular web page has loaded,
        the URL of the particular web page, and
        a count of unique users visiting the particular web page; and
    the redirector selecting the particular survey of the plurality of surveys in response to said determining that the one or more conditions upon which a survey invitation is spawned are met.

3. The method of claim 1, wherein:
    the particular set of data includes the URL of the particular web page; and
    the method further comprises:
        determining a topic of the particular web page based, at least in part, on the URL of the particular web page, and
        wherein the redirector selecting the particular survey is based on the particular survey being related to the same topic as the particular web page.

4. The method of claim 1, wherein:
    the particular set of data includes both the identifier of the particular ad campaign, and survey group information;
    the method further comprises:
        analyzing the survey group information to determine whether a quota for a number of survey respondents for a test group for the particular ad campaign has been met; and
        in response to determining that the quota for the number of survey respondents for the test group for the particular ad campaign has not been met:
            the redirector selecting the particular survey based on an association between particular survey and the particular ad campaign.

5. The method of claim 1, wherein:
    the particular set of data includes survey group information;
    the particular set of data indicates that the client has not loaded one or more advertisements for the particular ad campaign;
    the method further comprises:
        analyzing the survey group information to determine whether a quota for a number of survey respondents for a control group for the particular ad campaign has been met; and
    in response to determining that the quota for the number of survey respondents for the control group for the particular ad campaign has not been met, the redirector selecting the particular survey based on an association between particular survey and the particular ad campaign.

6. The method of claim 1, wherein:
the particular set of data includes quota information for the particular survey;
the method further comprises:
after the redirector selects the particular survey:
determining that a quota for a number of respondents for the particular survey has been met, and
in response to determining that the quota for the number of respondents for the particular survey has been met, shutting off the particular survey.

7. The method of claim 6, wherein:
the quota includes a first number of respondents for a first group for the particular survey and a second number of respondents for a second group for the particular survey; and
determining that the quota for the number of respondents for the particular survey has been met comprises determining that the quota for the number of respondents for each group has been met.

8. The method of claim 1, wherein:
the particular set of data includes survey statistics; and
the survey statistics include one or more of:
study statistics,
control statistics,
view through statistics,
a number of impressions, and
a number of completions.

9. The method of claim 1, wherein:
the particular set of data includes a list of active surveys; and
the redirector selecting the particular survey of the plurality of surveys comprises:
identifying the list of active surveys based, at least in part, on the identity of the particular web page, and
selecting the particular survey from surveys, of the plurality of surveys, that are included on the identified list of active surveys.

10. The method of claim 1, wherein:
the particular set of data includes both:
information identifying one or more particular advertisements that have been loaded at the client, and
information identifying one or more surveys in which a user of the client has participated;
the redirector selecting the particular survey comprises:
removing the one or more surveys in which the user of the client has participated from a list of candidate surveys for the user to produce a modified list of candidate surveys, and
selecting the particular survey, from the modified list of candidate surveys, based, at least in part, on the information identifying the one or more particular advertisements that have been loaded at the client.

11. One or more non-transitory computer-readable media storing one or more sequences of instructions which, when executed by one or more processors, cause performance of:
a redirector receiving cookie information from a client;
wherein the client sent the cookie information in response to a particular web page being decoded at said client;
wherein the cookie information includes first data for selecting a survey, wherein the first data includes one or more items from the following set of items:
an identifier of a particular ad campaign, of a plurality of ad campaigns, that is associated with one or more content items that were sent to the client before the particular web page was decoded at the client,
a URL of the particular web page, and
information identifying one or more particular advertisements that have been loaded at the client;
the redirector maintaining second data for selecting a survey, wherein the second data includes one or more items from the following set of items:
information identifying one or more surveys in which a user of the client has participated,
survey start times, and
survey expiration times;
the redirector selecting a particular survey of a plurality of surveys based, at least in part, on a particular set of data that comprises:
one or more items from the first data, and
one or more items from the second data; and causing an invitation to the particular survey to be displayed on the client.

12. The one or more non-transitory computer-readable media of claim 11, further comprising instructions for:
determining that one or more conditions upon which a survey invitation is spawned are met;
wherein determining that the one or more conditions are met is based, at least in part, on one or more of:
a sample rate for survey invitations,
a number of times the particular web page has loaded,
the URL of the particular web page, and
a count of unique users visiting the particular web page; and
the redirector selecting the particular survey of the plurality of surveys in response to said determining that the one or more conditions upon which a survey invitation is spawned are met.

13. The one or more non-transitory computer-readable media of claim 11, wherein:
the particular set of data includes the URL of the particular web page; and
the instructions further comprise instructions for:
determining a topic of the particular web page based, at least in part, on the URL of the particular web page, and
wherein the redirector selecting the particular survey is based on the particular survey being related to the same topic as the particular web page.

14. The one or more non-transitory computer-readable media of claim 11, wherein:
the particular set of data includes both the identifier of the particular ad campaign, and survey group information;
the instructions further comprise instructions for:
analyzing the survey group information to determine whether a quota for a number of survey respondents for a test group for the particular ad campaign has been met; and
in response to determining that the quota for the number of survey respondents for the test group for the particular ad campaign has not been met:
the redirector selecting the particular survey based on an association between particular survey and the particular ad campaign.

15. The one or more non-transitory computer-readable media of claim 11, wherein:
the particular set of data includes survey group information;
the particular set of data indicates that the client has not loaded one or more advertisements for the particular ad campaign;

the instructions further comprise instructions for:
   analyzing the survey group information to determine whether a quota for a number of survey respondents for a control group for the particular ad campaign has been met; and
   in response to determining that the quota for the number of survey respondents for the control group for the particular ad campaign has not been met, the redirector selecting the particular survey based on an association between particular survey and the particular ad campaign.

16. The one or more non-transitory computer-readable media of claim 11, wherein:
   the particular set of data includes quota information for the particular survey;
   the instructions further comprise instructions for:
     after the redirector selects the particular survey:
       determining that a quota for a number of respondents for the particular survey has been met, and
       in response to determining that the quota for the number of respondents for the particular survey has been met, shutting off the particular survey.

17. The one or more non-transitory computer-readable media of claim 16, wherein:
   the quota includes a first number of respondents for a first group for the particular survey and a second number of respondents for a second group for the particular survey; and
   determining that the quota for the number of respondents for the particular survey has been met comprises determining that the quota for the number of respondents for each group has been met.

18. The one or more non-transitory computer-readable media of claim 11, wherein:
   the particular set of data includes survey statistics; and
   the survey statistics include one or more of:
     study statistics,
     control statistics,
     view through statistics,
     a number of impressions, and
     a number of completions.

19. The one or more non-transitory computer-readable media of claim 11, wherein:
   the particular set of data includes a list of active surveys; and
   the redirector selecting the particular survey of the plurality of surveys comprises:
     identifying the list of active surveys based, at least in part, on the identity of the particular web page, and
     selecting the particular survey from surveys, of the plurality of surveys, that are included on the identified list of active surveys.

20. The one or more non-transitory computer-readable media of claim 11, wherein:
   the particular set of data includes both:
     information identifying one or more particular advertisements that have been loaded at the client, and
     information identifying one or more surveys in which a user of the client has participated;
   the redirector selecting the particular survey comprises:
     removing the one or more surveys in which the user of the client has participated from a list of candidate surveys for the user to produce a modified list of candidate surveys, and
   selecting the particular survey, from the modified list of candidate surveys, based, at least in part, on the information identifying the one or more particular advertisements that have been loaded at the client.

\* \* \* \* \*